US009701072B2

(12) United States Patent
Corman

(10) Patent No.: US 9,701,072 B2
(45) Date of Patent: Jul. 11, 2017

(54) METHODS OF REPAIRING MATRIX CRACKS IN MELT INFILTRATED CERAMIC MATRIX COMPOSITES

(71) Applicant: GENERAL ELECTRIC COMPANY, Schenectady, NY (US)

(72) Inventor: Gregory Scot Corman, Ballston Lake, NY (US)

(73) Assignee: General Electric Company, Niskayuna, NY (US)

( * ) Notice: Subject to any disclaimer, the term of this patent is extended or adjusted under 35 U.S.C. 154(b) by 856 days.

(21) Appl. No.: 14/067,322

(22) Filed: Oct. 30, 2013

(65) Prior Publication Data
US 2015/0115489 A1    Apr. 30, 2015

(51) Int. Cl.
| | | |
|---|---|---|
| C03B 29/00 | (2006.01) |
| C04B 37/00 | (2006.01) |
| B29C 73/00 | (2006.01) |
| B29C 65/00 | (2006.01) |
| B32B 37/00 | (2006.01) |

(Continued)

(52) U.S. Cl.
CPC ........... *B29C 73/00* (2013.01); *B23P 6/045* (2013.01); *B29C 73/02* (2013.01); *B29C 73/16* (2013.01); *C04B 41/009* (2013.01); *C04B 41/5096* (2013.01); *C04B 41/85* (2013.01);
(Continued)

(58) Field of Classification Search
CPC  B32B 31/26; B32B 37/00; B32B 7/08; B32B 31/20; B32B 9/00; C04B 37/00; C04B 2235/40; C04B 2235/401; C04B 41/009; C04B 41/5096; C04B 41/85; B29C 65/00; B29C 73/00; B29C 73/02; B29C 73/16; F01D 5/005; B23P 6/002; B23P 6/04; B23P 6/045
See application file for complete search history.

(56) References Cited

U.S. PATENT DOCUMENTS 4,737,328 A *  4/1988  Morelock ............ C04B 35/573
                                                      264/101
5,962,103 A    10/1999  Luthra et al.
(Continued)

FOREIGN PATENT DOCUMENTS

| | | |
|---|---|---|
| CN | 1220649 A | 6/1999 |
| CN | 1318041 A | 10/2001 |
| WO | 2013079853 A1 | 6/2013 |

OTHER PUBLICATIONS

PCT search report and written opinion issued in relation to corresponding application PCT/US14/57571 on Jan. 5, 2015.
(Continued)

*Primary Examiner* — Alex Efta
(74) *Attorney, Agent, or Firm* — Nitin N. Joshi

(57) ABSTRACT

A method of repairing matrix microcracks in MI-CMC components includes heating "free" silicon phase present within the cracked matrix portion of the component to a temperature above the melting point of the silicon phase. During heating of the component an additional source of silicon phase is supplied to the component. The atmosphere about the component is controlled during the heating of the component. The MI-CMC component is cooled below the melting point of the silicon phase to cool and solidify the silicon phase that has migrated into the microcracks to thereby bond the crack faces together.

19 Claims, 2 Drawing Sheets

(51) Int. Cl.

| | | |
|---|---|---|
| *B65C 9/25* | (2006.01) | |
| *B29C 73/16* | (2006.01) | |
| *B23P 6/04* | (2006.01) | |
| *B29C 73/02* | (2006.01) | |
| *F01D 5/00* | (2006.01) | |
| *C04B 41/85* | (2006.01) | |
| *C04B 41/00* | (2006.01) | |
| *C04B 41/50* | (2006.01) | |
| *B23P 6/00* | (2006.01) | |

(52) U.S. Cl.
CPC .............. *F01D 5/005* (2013.01); *B23P 6/002* (2013.01); *B23P 6/04* (2013.01)

(56) References Cited

U.S. PATENT DOCUMENTS

| | | | | |
|---|---|---|---|---|
| 5,965,266 | A * | 10/1999 | Goujard | C04B 35/013 427/228 |
| 6,024,898 | A * | 2/2000 | Steibel | C04B 35/806 264/29.1 |
| 6,063,514 | A * | 5/2000 | Nishioka | C04B 41/009 428/312.6 |
| 6,403,158 | B1 | 6/2002 | Corman | |
| 6,635,339 | B1 | 10/2003 | Adler et al. | |
| 6,638,568 | B1 | 10/2003 | Baecker et al. | |
| 7,658,781 | B1 * | 2/2010 | Waggoner | C04B 35/565 428/539.5 |
| 8,728,261 | B2 * | 5/2014 | Ide | B82Y 30/00 156/283 |
| 2003/0004050 | A1 * | 1/2003 | Christ | C04B 35/565 501/88 |
| 2006/0163773 | A1 | 7/2006 | Gray | |
| 2007/0099527 | A1 | 5/2007 | Brun et al. | |
| 2010/0009143 | A1 | 1/2010 | Pailler et al. | |
| 2010/0059166 | A1 | 3/2010 | Riedell et al. | |
| 2010/0279845 | A1 * | 11/2010 | Kebbede | C04B 35/573 501/90 |
| 2013/0022471 | A1 * | 1/2013 | Roberts, III | F01D 5/005 416/229 R |
| 2013/0096217 | A1 * | 4/2013 | Schmidt | C04B 35/6269 521/154 |

OTHER PUBLICATIONS

Kelina, et al; "Resistance of Si3N4/Cf Ceramic-Matrix Composites to High-Temperature Oxidation," Refractories and Industrial Ceramics, vol. 44, Issue 4 (Jul.-Aug 2003), pp. 249-253.

Smeacetto, et al; "Protective Coatings for Carbon Bonded Carbon Fibre Composites," Ceramics International, vol. 34, Issue 5, Jul. 2008, pp. 1297-1301.

Wataru Nakao; "Self-healing in ceramics based nanocomposite," Proceedings of the ASME Conference on Smart Materials, Adaptive Structures and Intelligent Systems 2009, vol. 2, pp. 123-130.

Wataru Nakao; "Second step approach for self healing ceramics," 6th International Conference on Processing and Manufacturing of Advanced Materials—THERMEC'2009, vol. 638-642, 2010, pp. 2133-2137.

Nakao, et al; "SiC nanometer sizing effect on self healing ability of structural ceramics," Ceramic Engineering and Science Proceedings, vol. 30, Issue 2, 2010, pp. 137-142.

Quemard, et al; "High potential of composites with carbon fibers and a self-sealing ceramic matrix in moist environments under high pressures at 600 degrees C," Ceramic Transactions, vol. 215, 2010, pp. 125-134.

Unofficial English Translation of Chinese Office Action issued in connection with corresponding CN Application No. 201480060837.3 on Nov. 28, 2016.

* cited by examiner

METHODS OF REPAIRING MATRIX CRACKS IN MELT INFILTRATED CERAMIC MATRIX COMPOSITES

BACKGROUND

The present disclosure generally relates to methods and related configurations, components and assemblies of repairing cracks in ceramic matrix composites (CMCs), and in particular repairing matrix cracks in fiber-reinforced melt infiltrated ceramic matrix composites (MI-CMCs).

Monolithic ceramics, such as SiC ceramics, were developed many years ago but never found their way into high temperature structural applications because they lack damage tolerance and they fail catastrophically. Ceramic matrix composites (CMCs), particularly those reinforced with fibers, were developed to alleviate the damage tolerance issues of monolithic ceramics and thereby have become attractive for high temperature structural applications, such as in gas turbine engines. One type of fiber-reinforced CMCs that is particularly attractive for high temperature structural applications is reactive melt infiltrated fiber-reinforced CMCs (hereinafter 'MI-CMCs").

In MI-CMCs, a preform of fibers and matrix constituents is infiltrated with a metal which produces a ceramic matrix when reacting with the matrix constituents. SiC-based MI-CMCs, wherein the infiltrating metal is silicon or a silicon alloy and the matrix constituents are such that the resulting matrix is substantially SiC (e.g., SiC and/or C particulates), are particularly attractive for high temperature structural applications because of their high thermal conductivity, excellent thermal shock resistance, creep resistance, and oxidation resistance compared to other CMCs.

One current disadvantage of MI-CMCs is that they are relatively expensive, and therefore MI-CMC components need to be in working condition for extended periods of time to be economically viable. For example, in gas turbine applications MI-CMC components are expected to last through several engine service intervals. Unfortunately during use in typical high temperature structural applications (e.g., gas turbine applications) MI-CMC components are often subjected to loads above the matrix cracking stress of the components. The resulting cracks in the matrix portion of the components from such stresses act to decrease the stiffness and oxidation resistance of the MI-CMC composite, and can lead to premature failure of the MI-CMC component. Further, temporary overstress conditions, such as from dropped parts or tools, can occur during MI-CMC component fabrication, transportation and/or installation and also can result in matrix cracks.

As a result, a need exists for methods and related configurations, components and assemblies for repairing matrix cracks in MI-CMC components to restore them to a usable condition.

BRIEF DESCRIPTION

Methods of repairing one or more cracks in a matrix portion of a melt-infiltrated ceramic matrix composite (CMC) component with a matrix portion comprising substantially silicon carbide and areas of silicon phase dispersed within the silicon carbide are disclosed. In some embodiments, the method includes heating the melt-infiltrated CMC component to a first temperature above the melting point of the silicon phase to form molten silicon phase within the matrix portion. In some embodiments, the method includes controlling the atmosphere about the melt-infiltrated CMC component while heating the melt-infiltrated CMC component to the first temperature above the melting point of the silicon phase. In some embodiments, the method includes cooling the melt-infiltrated CMC component to a second temperature that is below the first temperature to solidify molten silicon phase that has flowed into one or more cracks to bond surfaces of the at least one crack together.

These and other objects, features and advantages of this disclosure will become apparent from the following detailed description of the various aspects of the disclosure taken in conjunction with the accompanying drawings.

DRAWINGS

DETAILED DESCRIPTION

Figure 1:
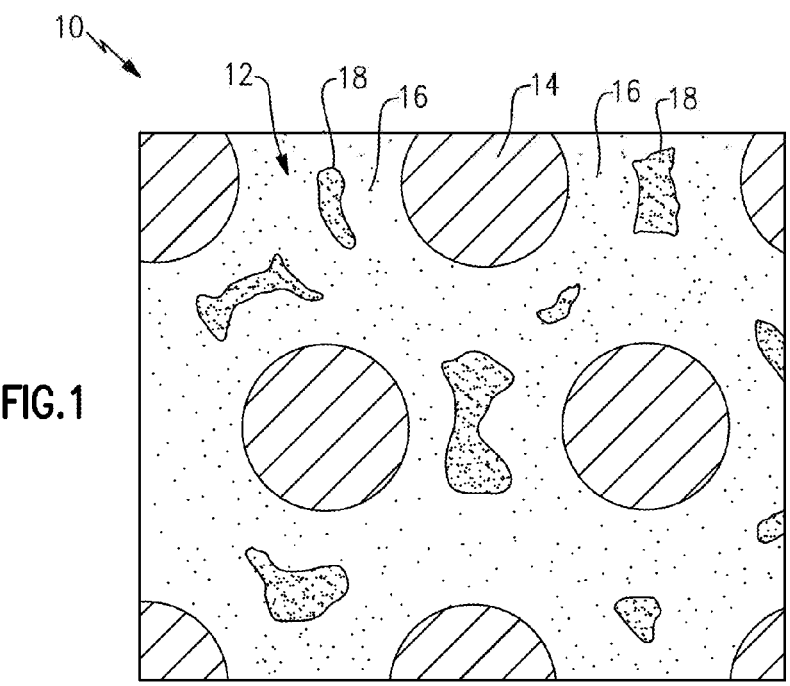
FIG. 1 is a depiction of a cross-sectional view of an exemplary melt infiltrated fiber-reinforced SiC-based ceramic matrix composite according to the present disclosure.

Each embodiment presented below facilitates the explanation of certain aspects of the disclosure, and should not be interpreted as limiting the scope of the disclosure. Moreover, approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value. When introducing elements of various embodiments, the articles "a," "an," "the," and "said" are intended to mean that there are one or more of the elements. The terms "comprising," "including," and "having" are intended to be inclusive and mean that there may be additional elements other than the listed elements. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. Any examples of operating parameters are not exclusive of other parameters of the disclosed embodiments. Components, aspects, features, configurations, arrangements, uses and the like described, illustrated or otherwise disclosed herein with respect to any particular embodiment may similarly be applied to any other embodiment disclosed herein.

A variety of production or manufacturing methods have been developed for the fabrication of melt infiltrated fiber-reinforced ceramic matrix composites (MI-CMCs). One process is known as the "prepreg process" and another is known as the "slurry cast" process, such as disclosed in U.S.

Patent Publication No. 2006/0163773. While both the prepreg and slurry cast processes utilize a slurry of matrix constituents (e.g., SiC and/or carbon particulate, binders, solvents, etc.), the processes primarily differ in how the green composite perform is formed. The final densification step in both processes, however, is a silicon melt infiltration step into the green composite performs.

Once a green body composite preform containing the fibers and matrix constituents is formed, it is heated while in contact with a source of silicon metal or alloy which produces a ceramic matrix when reacting with the matrix constituents. The molten infiltrating silicon phase readily wets the matrix constituents (e.g., SiC and/or carbon matrix constituents) of the green body composite preform, and therefore is easily pulled into a portion of the porosity of the preform by capillary action. No external driving force is typically needed for the infiltration of silicon into the matrix constituents and there is typically no dimensional change of the composite preform as a result of the infiltration (as the porosity of the preform is filled with silicon). Current conventional processes for melt infiltration of fiber-reinforced CMCs using silicon (e.g., silicon metal or alloy) utilize batch processes where either silicon metal powder is applied onto the surface of the preform, or silicon is transferred to the preform in the molten state using a porous carbon wick.

Figure 2:
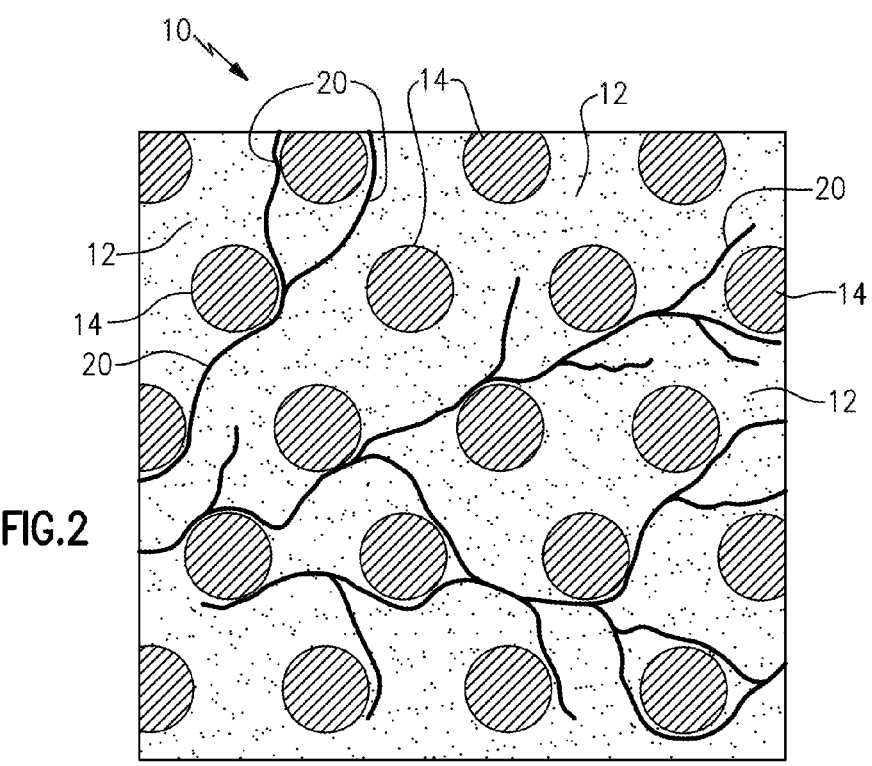
FIG. 2 is a depiction of a cross-sectional view of the exemplary melt infiltrated fiber-reinforced SiC-based ceramic matrix composite of FIG. 1 with exemplary microcracks according to the present disclosure.

Utilizing the prepreg and slurry cast processes, melt infiltrated SiC-based ceramic matrix composites (SiC-based MI-CMCs) are fiber reinforced silicon carbide (SiC) matrix composites, such as shown by the cross-sectional views of the exemplary SiC-based MI-CMC component 10 in FIGS. 1 and 2. When SiC fiber is utilized, the resulting CMCs may be referred to as a SiC/SiC MI-CMCs. In general, SiC-based MI-CMC components are made by melt infiltration of silicon metal or alloy into a preform containing fibers (e.g., BN-coated silicon carbide fibers) embedded in SiC and/or carbon matrix constituents.

As shown in FIG. 1, upon infiltration of the molten silicon, such as via capillary action during the silicon infiltration processes discussed above, the silicon is drawn into some of the porosity of the matrix constituents and reacts with the carbon thereof to form a SiC-based MI-CMC component 10 with a matrix portion 12 including a substantially SiC crystalline structure 16 about the fibers 14 (e.g., SiC fibers). In addition to forming the ceramic SiC crystalline structure 16 of the matrix portion 12, the silicon infiltration process fills at least some of the remaining porosity of the matrix portion 12 with silicon metal or alloy that does not react with the carbon of the constituents. In this way, interconnected pockets of "free" or un-reacted silicon phase 18 are formed within the matrix portion 12. A silicon phase is defined herein as containing substantially elemental silicon with any other elements, such as boron, dissolved in the silicon phase. In this way, the matrix portion 12 of some exemplary SiC-based MI-CMCs 10 is a substantially Si—SiC matrix portion 12. In some embodiments, the amount of infiltrated "free" silicon phase 18 in the matrix portion 12 (i.e., Si that does not form SiC) is about 2 vol % to about 50 vol % of the matrix portion 12, and more preferably about 5 vol % to about 35 vol % of the matrix portion 12, and even more preferably about 7 vol % to about 20 vol % of the matrix portion 12.

In some exemplary embodiments, an exemplary SiC-based MI-CMC component 10 may be subjected to one or more temporary loads or stresses such that cracks 20 are formed in at least the matrix portion 12, as shown in FIG. 2. Cracks 20 may include any fracture, discontinuity, void, fissure, anomaly, separation or the like. For example, during manufacture, shipment or use the component 10 may be temporarily loaded to levels above the matrix cracking stress of the matrix portion 12 (e.g., the matrix cracking stress of a Si—SiC matrix portion 12). In some such embodiments, the matrix cracks 20 formed in the matrix portion 12 of a SiC-based MI-CMC component 10 may be matrix microcracks 20 such that they include a width at their widest portion of up to about 20 microns, and more preferably up to about 5 microns.

Matrix cracks 20 may act to decrease the stiffness and oxidation resistance of the composite component 10, and can thereby lead to premature failure during use. For example, matrix cracks 20, such as exemplary matrix microcracks 20 of the exemplary the SiC-based MI-CMC component 10 shown in FIG. 2, may be effective in reducing at least one of the proportional (elastic) limit (PL), modulus of elasticity (E), and ultimate strength of a MI-CMC component 10 as compared to an uncracked component. The matrix cracks 20 may also lead to environmental degradation of the matrix portion 16 of a MI-CMC component 10, or to the fibers or fiber coatings of the MI-CMC component, which, in turn, further acts to reduce at least one of the PL, E, and ultimate strength of the component 10 as compared to the uncracked component 10.

Figure 3:
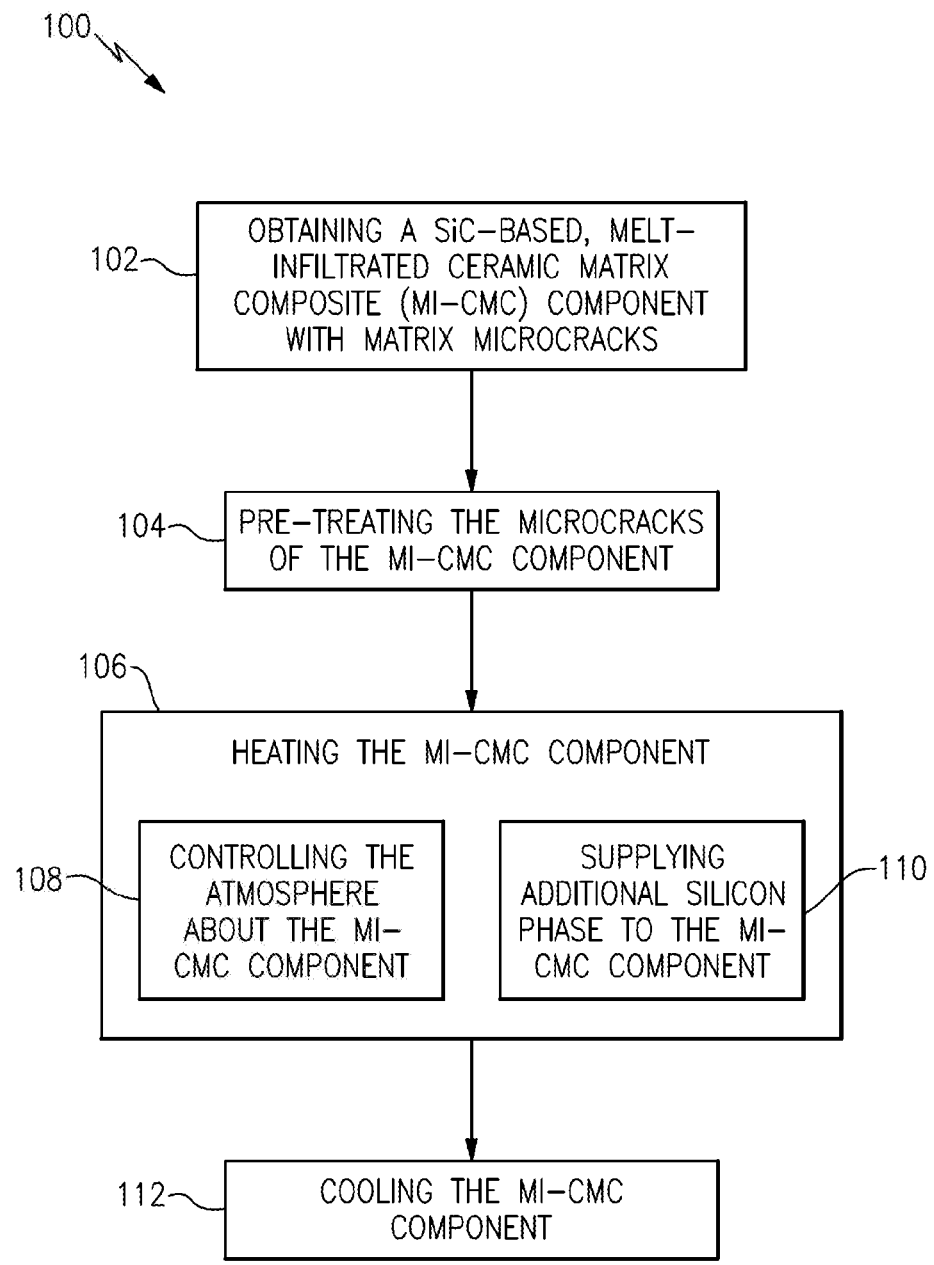
FIG. 3 is a flow chart depicting a method of repairing the exemplary microcracks of the exemplary melt infiltrated fiber-reinforced SiC-based ceramic matrix composite of FIG. 2.

As shown in FIG. 3, an exemplary method 100 of repairing the matrix cracks of MI-CMC components, such as the matrix microcracks 20 of the exemplary SiC-based MI-CMC component 10 shown in FIG. 2, may include obtaining 102 a SiC-based MI-CMC component 10 with matrix cracks 20 formed from at least one over-stress event. In some embodiments, obtaining a SiC-based MI-CMC component 10 with matrix cracks 20 may include removing such a component 10 from use (e.g., from a gas turbine). Once a SiC-based MI-CMC component 10 with matrix cracks 20 is obtained 102, the method 100 of repairing the matrix cracks 20 may include heating 106 the component 10 to a temperature above the melting point of the residual "free" silicon phase 18 contained within the matrix microstructure portion 12, as shown in FIG. 3. In some embodiments, the cracked component 10 may be heated 106 to a temperature of at least about 1380° C. In some embodiments, the cracked component 10 may be heated 106 to a temperature of at least about 1420° C. In some embodiments the component 10 may be heated 106 for a relatively short amount of time to prevent the molten Si within the matrix portion 12 to interact or otherwise "attack" other constituents of the component 10 (besides flowing into and substantially filling the matrix cracks 20). In some such embodiments the component 10 may be heated 106 within the range of about 5 minutes to about 30 minutes, and preferably within the range of about 10 minutes to about 20 minutes.

In some embodiments, as shown in FIG. 3, an exemplary method 100 of repairing matrix cracks 20 of MI-CMC components 10 may include controlling 108 the atmosphere about the component 10 while the component 10 is heated 106. In some embodiments controlling 108 the atmosphere about the component 10 while the component 10 is heated 106 includes heating 106 the component 10 in a vacuum furnace. In some such exemplary embodiments, the vacuum furnace may be configured to heat 106 the component 10 in a non-oxidizing atmosphere (i.e. the residual gases within the furnace have no significantly deleterious effect on the infiltrating silicon). In some embodiments the furnace may be configured to heat 106 the component 10 in an inert gas atmosphere. In some embodiments the furnace may be configured to heat 106 the component 10 in a vacuum to substantially remove gas that is trapped or formed within the component 10. For example, in some embodiments the furnace may be configured to heat 106 the component 10 in a vacuum within the range of about 0.01 torr to about 2 torr, and preferably within the range of about 0.1 torr to about 1 torr.

In some embodiments, the matrix cracks 20 of some MI-CMC components 10 may be exposed to the environment such that oxidation occurs. For example, in some embodiments environmental conditions may cause an oxide film, such as silica or SiO2, to form on the surfaces or faces of the matrix cracks 20 (i.e., surfaces of the matrix portion 12 that are exposed or formed by the matrix cracks 20). An oxide film on the surfaces of the matrix cracks 20 may act to limit, and potentially substantially prevent, the flow of molten silicon phase into the matrix cracks 20. To account for such environmental degradation of the matrix cracks 20 of the component 10, in some embodiments the exemplary method 100 of repairing matrix cracks 20 of MI-CMC components 10 may include pre-treating 104 the component 10 (see FIG. 3) to substantially remove, at least in part, any oxide film that has formed on the matrix cracks 20. For example, in some embodiments the method of repairing matrix microcracks 20 of MI-CMC components 10 may include pre-treating 104 the component 10 with an etchant to substantially remove oxide film on the surfaces or faces of the matrix cracks 20. In some other embodiments, the method 100 of repairing matrix microcracks 20 of MI-CMC components 10 may include pre-treating 104 the component 10 by applying a carbon film on an oxide film that has formed on the surfaces of the matrix cracks 20. For example, the method of pre-treating 104 the component 10 may include applying a carbon film on an oxide film that has formed on the surfaces of the matrix cracks 20 via chemical vapor deposition (CVD) or by pyrolysis of a carbonaceous resin. In some embodiments, the carbon film may act to remove the oxide film or surface layer via carbothermic reduction of the oxide (e.g., SiO2) by the carbon of the carbon film, potentially yielding volatile gas (e.g., SiO) at pressures below ~0.01 bar.

As shown in FIG. 3, some embodiments of the method 100 of repairing matrix cracks 20 of MI-CMC components 10 may include supplying 110 additional silicon phase 18 to the component or composite 10 during heating 106 of the composite 10. In some embodiments, supplying 110 additional silicon phase 18 to the composite 10 during heating 106 may include applying silicon phase 18 to the exterior of the composite 10 while the composite 10 is heated 106. For example, supplying 110 additional silicon phase 18 to the composite 10 may include positioning silicon alloy in contact with one or more exterior surface of the composite 10 being repaired when the composite is heated 106. In some such embodiments, the silicon phase applied to the exterior of the composite 10 during heating 106 thereof may be a silicon-BN pack. In some embodiments, supplying 110 additional silicon phase 18 to the composite during heating 106 thereof may be effective in positioning molten silicon phase 18 into the matrix cracks 20, such as via capillary action, if additional silicon phase 18 above that present within the matrix portion 12 is needed to ensure adequate supply of silicon alloy 18 to substantially fill and thereby repair the matrix cracks 20. In some embodiments, supplying 110 additional silicon phase 18 to the composite during heating 106 thereof may be effective in preventing the molten silicon phase 18 contained within the matrix portion 12 of the composite 10 from evaporating out of the composite 10 and, as a result, failing to substantially fill and bond the faces of the matrix cracks 20 together. In these ways, applying 110 additional silicon phase 18 to the composite during heating 106 thereof may ensure that an adequate amount of silicon phase 18 migrates into the matrix cracks 20 and thereby substantially bonds the surfaces or faces of the matrix cracks 20 together (i.e., repairs the matrix cracks 20).

In some embodiments, when the cracked composite component 10 is heated 106 above the melting point of the residual Si phase 18 in the matrix portion 12, the molten Si phase 18 (the silicon phase 18 within the matrix portion 12 and/or the additional externally supplied silicon phase 18) wicks into the matrix cracks 20. The molten Si phase 18 may migrate into the matrix cracks 20 via capillary action. The molten Si phase 18 (introduced during fabrication via melt infiltration and/or externally applied during heating) may substantially fill the matrix cracks 20. For example, the molten Si metal phase 18 of the matrix microstructure portion 12 may fill at least about 50% of the volume of the matrix cracks 20, and more preferably at least about 80% of the volume of the matrix cracks 20.

As shown in FIG. 3, in some embodiments after the cracked component 10 is heated 106 above the melting point of the residual Si phase 18 in the matrix portion 12 and molten Si phase 18 substantially fills the matrix cracks 20, the method 100 of repairing the matrix cracks 20 may include cooling 112 the component 10 to a temperature below the melting point of the molten Si phase 18 to repair the cracks. Upon cooling 112 the component below the melting point of the Si phase 18, the molten Si phase 18 present within the matrix cracks 20 may substantially solidify and substantially bond the crack surfaces or faces together (e.g., SiC surfaces). In this way, the exemplary method 100 of repairing matrix cracks 20 of MI-CMC components 10 as shown in FIG. 3 may be effective in "healing" such matrix cracks 20.

In some embodiments an exemplary MI-CMC component 10 with matrix cracks 20, as that shown in FIG. 2, that is repaired with the matrix crack repair methods disclosed herein (e.g., see FIG. 3) may include a proportionality (elastic) limit (PL) at least about within 10%, a modulus of elasticity (E) at least about within 20%, and an ultimate strength that is within at least about 20% as compared to the component 10, ignoring strain, immediately prior to the formation of the matrix cracks 20.

The following examples are illustrative of the methods and related configurations, components and assemblies for repairing matrix cracks in MI-CMC components disclosed herein.

EXAMPLE 1

Two panels of pre-impregnated MI-CMC, measuring about 6 in by 6 in by 0.08 in, were tested. The material of the panels is available under the trade name of HiPerComp™. The panels were cut into about 6 in long by 0.5 in wide MI-CMC bars. As-fabricated HiPerComp™ CMC is known to include residual stress in the matrix portion thereof that affects the measurement of the proportional limit stress of the material. To relieve such residual stress, six of the bars were annealed by either (a) heating them in air at about 2400° F. (about 1315° C.) for about 100 hours, (b) by reheating them for about 20 minutes above the melting point of silicon therein under a vacuum, or by using both treatments (a) and (b). The heat treated MI-CMC bars were then tested to failure at room temperature via a tensile test (using procedures as outlined in ASTM C1275) and the PL, E and ultimate strength of each heat treated MI-CMC bar were determined. The PL was determined using the 0.005% strain offset method. All of the heat treated MI-CMC bars that were tested had nominally equal tensile strength characteristics (PL, E and ultimate strength) within the normal variability of HiPerComp™.

Four other test MI-CMC bars (taken from the same HiPerComp™ panels) were subjected to about 0.15% in-plane tensile strain to produce microcracks within the matrix portion of the MI-CMC bars. Two of the cracked MI-CMC bars were tensile tested to failure, as described above, to determine their effective PL, E and ultimate strength. The other two cracked MI-CMC bars were repaired by heating the panels in a vacuum furnace at 1435° C. degrees for about 30 minutes at a vacuum level of about 0.2 torr. Silicon phase was supplied to the MI-CMC bars by silicon-BN packs placed on a surface of the bars while they were heated. The repaired MI-CMC bars were tensile tested to failure as previously described, and the PL, E and ultimate strength of each repaired MI-CMC bar was determined.

Tensile testing results for the three sets of MI-CMC bars (annealed, cracked and repaired) are listed in TABLE 1 below. The tensile strength data for the cracked samples, as shown in TABLE 1, where the measured proportional limit stress was reduced by more than 40% and the initial modulus was reduced by 12% relative to the annealed and repaired MI-CMC bars, indicates that the strain exposure was sufficient to introduce matrix cracks. Following the repair treatment, the proportional limit of the test MI-CMC bars was restored to within 2% of that of the uncracked annealed MI-CMC bars, and the initial modulus was restored to within 2% of that of the uncracked annealed MI-CMC bars, as shown in TABLE 2. The ultimate strength, which is known to be a fiber-dominated property, would not be expected to be reduced by the cracking treatment. The observed 8% reduction in ultimate strength for the cracked MI-CMC bars relative to the annealed MI-CMC bars likely represents normal material variability. However, as shown in TABLE 2, the ultimate strength of the repaired MI-CMC bars is substantially the same as that of the cracked MI-CMC bars. The substantially similar ultimate strength indicates that the repair heat treatment did not cause any additional degradation to the fibers or fiber coatings of the MI-CMC bars.

TABLE 1

Tensile Strength Test Results from
the Test MI-CMC Bars from EXAMPLE 1

| Condition of Sample | Average Proportional Limit Stress (ksi) | Average Initial Modulus (Msi) | Average Ultimate Strength (ksi) |
|---|---|---|---|
| Annealed | 28.3 | 40.0 | 41.2 |
| Cracked | 16.3 | 35.2 | 37.8 |
| Repaired | 27.9 | 39.2 | 37.6 |

EXAMPLE 2

A panel of pre-impregnated MI-CMC material reinforced with coated Hi-Nicalon fiber was manufactured according to the procedures described in U.S. Patent Application No. 2007/0099527 and U.S. Pat. No. 6,024,898. Test MI-CMC bars were cut from this panel and subjected to the same testing procedures as described above with respect to EXAMPLE 1. Three MI-CMC bars were tensile strength tested in the annealed condition, one MI-CMC bar was tensile strength tested in the cracked condition, and two MI-CMC bars were tensile strength tested in the repaired condition as described above with respect to EXAMPLE 1. The results of the tensile strength testing of the annealed, cracked and repaired MI-CMC bars are listed in Table 2 below.

TABLE 2

Tensile Strength Test Results from
the Test MI-CMC Bars from EXAMPLE 2

| Condition of Sample | Average Proportional Limit Stress (ksi) | Average Initial Modulus (Msi) | Average Ultimate Strength (ksi) |
|---|---|---|---|
| Annealed | 21.1 | 40.0 | 30.5 |
| Cracked | 12.5 | 29.9 | 31.8 |
| Repaired | 19.9 | 40.6 | 33.3 |

As shown in TABLE 2, the cracking treatment of the MI-CMC bars caused about a 40% or greater decrease in the measured proportional limit of the MI-CMC bars and about 25% or greater decrease in the initial modulus of the MI-CMC bars relative to the annealed MI-CMC bars. As also shown in TABLE 2, the repair treatment restored the proportional limit to within 6% of the annealed MI-CMC bars. Further, the modulus of the repaired MI-CMC bars exceeded that of the annealed MI-CMC bars.

Both the precracking and repair treatments resulted in slight increases in the measured experiential ultimate strength of the MI-CMC bars, as shown in TABLE 2, though the range of values of the metrics is within the normal material variability for this property of the MI-CMC bars. The significant improvements in proportional limit and initial modulus of the repair treatment to the cracked MI-CMC bars, with no reduction in the ultimate strength, demonstrates the effectiveness of the repair treatment in healing matrix cracks without causing significant or effective degradation to the fibers or fiber coatings.

It is to be understood that the above description is intended to be illustrative, and not restrictive. Numerous changes and modifications may be made herein by one of ordinary skill in the art without departing from the general spirit and scope of the invention as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A method of repairing one or more cracks in a matrix portion of a melt-infiltrated ceramic matrix composite (CMC) component with a matrix portion comprising substantially silicon carbide and areas of silicon phase dispersed within the silicon carbide, the method comprising:
   heating the melt-infiltrated CMC component to a first temperature above the melting point of the silicon phase to form molten silicon phase within the matrix portion, wherein the molten silicon phase flows into the one or more cracks;
   controlling the atmosphere about the melt-infiltrated CMC component while heating the melt-infiltrated CMC component to the first temperature above the melting point of the silicon phase;
   cooling the melt-infiltrated CMC component to a second temperature that is below the first temperature to solidify the molten silicon phase that has flowed into one or more cracks to bond surfaces of the at least one or more cracks together; and
   supplying additional molten silicon phase to the melt-infiltrated CMC component while the melt-infiltrated CMC component is heated above the melting point of the silicon phase.

2. The method of claim 1, wherein applying additional molten silicon phase to the melt-infiltrated CMC component while the melt-infiltrated CMC component is heated above the melting point of the silicon phase includes positioning the additional silicon phase against an external surface of the component.

3. The method of claim 1, wherein during heating the melt-infiltrated CMC component to the first temperature above the melting point of the silicon phase to form molten silicon phase within the matrix portion, the molten silicon phase flows into the one or more cracks via capillary action.

4. The method of claim 1, wherein the silicon phase is substantially elemental silicon with any other elements dissolved within the silicon phase.

5. The method of claim 4, wherein boron is dissolved within the silicon phase.

6. The method of claim 1, wherein the component includes silicon carbide fibers in the matrix portion.

7. The method of claim 1, wherein the first temperature is at least about 1380° C.

8. The method of claim 1, wherein controlling the atmosphere about the melt-infiltrated CMC component includes providing an inert atmosphere about the component.

9. The method of claim 1, wherein controlling the atmosphere about the melt-infiltrated CMC component includes providing a vacuum about the component.

10. The method of claim 1, wherein the vacuum is within the range of about 0.01 torr to about 2 torr.

11. The method of claim 10, wherein the vacuum is within the range of about 0.1 torr to about 1 torr.

12. The method of claim 1, wherein controlling the atmosphere about the melt-infiltrated CMC component includes providing a non-oxidizing atmosphere about the component.

13. A method of repairing one or more cracks in a matrix portion of a melt-infiltrated ceramic matrix composite (CMC) component with a matrix portion comprising substantially silicon carbide and areas of silicon phase dispersed within the silicon carbide, the method comprising:
   heating the melt-infiltrated CMC component to a first temperature above the melting point of the silicon phase to form molten silicon phase within the matrix portion, wherein the molten silicon phase flows into the one or more cracks;
   controlling the atmosphere about the melt-infiltrated CMC component while heating the melt-infiltrated CMC component to the first temperature above the melting point of the silicon phase;
   cooling the melt-infiltrated CMC component to a second temperature that is below the first temperature to solidify the molten silicon phase that has flowed into one or more cracks to bond surfaces of the at least one or more cracks together; and
   pre-treating the melt-infiltrated CMC component to substantially remove any oxide film that has formed on the one or more cracks before heating the melt-infiltrated CMC component to the first temperature.

14. The method of claim 13, wherein pre-treating the melt-infiltrated CMC component includes utilizing an etchant to substantially remove the oxide film.

15. The method of claim 13, wherein pre-treating the melt-infiltrated CMC component includes forming a carbon film on the oxide film via at least one of chemical vapor deposition (CVD) and pyrolysis of a carbonaceous resin.

16. The method of claim 15, including utilizing the carbon film to substantially remove the oxide film via carbothermic reduction.

17. The method of claim 1, wherein heating the melt-infiltrated CMC component to the first temperature above the melting point of the silicon phase to form molten silicon phase within the matrix portion includes maintaining the temperature of the melt-infiltrated CMC component above the melting point of the silicon phase within the range of about 5 minutes to about 30 minutes.

18. The method of claim 17, wherein heating the melt-infiltrated CMC component to the first temperature above the melting point of the silicon phase to form molten silicon phase within the matrix portion includes maintaining the temperature of the melt-infiltrated CMC component above the melting point of the silicon phase within the range of about 10 minutes to about 20 minutes.

19. The method of claim 1, wherein at least about 7 volume percent to about 20 volume percent silicon phase is dispersed within the silicon carbide matrix.

* * * * *